United States Patent Office 3,257,434
Patented June 21, 1966

3,257,434
16-METHYL-15-DEHYDRO-CORTICOIDS
Octavio Mancera, Howard J. Ringold, and Carl Djerassi, all of Mexico City, Mexico, assignors, by mesne assignments, to Syntex Corporation, a corporation of Panama
No Drawing. Filed Feb. 11, 1960, Ser. No. 7,999
Claims priority, application Mexico, May 6, 1959, 54,480
30 Claims. (Cl. 260—397.45)

The present invention relates to new cyclopentanophenanthrene derivatives.

More specifically, it relates to novel steroidal $\Delta^{15}$-cortical hormones of the formula:

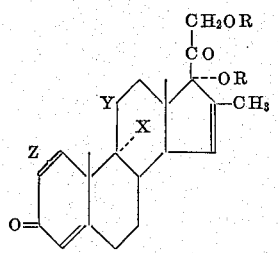

wherein R is selected from the group consisting of hydrogen and the acyl radical of a hydrocarbon carboxylic acid having up to 12 carbon atoms. Y is selected from the group consisting of

and =O; X is selected from the group consisting of hydrogen and fluorine, and Z represents the linkage between C–1 and C–2 selected from the group consisting of single bond and double bond.

The hydrocarbon carboxylic acid from which the aforesaid acyl radical is derived is either saturated or unsaturated, of straight, branched, cyclic or mixed straight (branched)-cyclic chain, which acid may be substituted with group such as hydroxyl, O-acyl (of less than 12 carbon atoms), alkoxy (of less than 9 carbon atoms), amino or halogen (fluorine, chlorine or bromine); typical esters among the novel compounds are the acetate, propionate, i-butyrate, hemisuccinate, enanthate, caproate, benzoate, trimethylacetate, phenoxyacetate, aminoacetate and β-chloropropionate.

The acyl groups may further derive from sulfonic acids or from sulfuric acid; the new compounds can also be under the form of derivatives soluble in water, such as for example the alkali salts of their hemisuccinates, the disodium salts of their esters formed with phosphoric acids, or the hydrohalides of esters formed with aminoacids.

The above described new compounds are hormones of cortical activity and are particularly active as anti-estrogenic and glycogenic agents. The 17,21-diesters of these compounds are progestational agents.

The new compounds possess as functional groups apart from the necessary 3-keto-$\Delta^4$-arrangement, an oxygen function at C–11, a free or esterified hydroxyl group at C–21, a free or esterified hydroxyl group at C–17α and optionally a halogen atom at C–9α.

They are produced from the corresponding allo- or $\Delta^5$-compounds having a free or esterified hydroxy group at C–3 and the 16-methyl-17α-hydroxy-15-dehydro-arrangement characteristic of this entire class of compounds, and we have discovered that the necessary reactions of introducing the missing functional groups, i.e. oxidation to 3-keto, introduction of hydroxy at C–21 and C–11, eventual halogenation at C–9α and eventual introduction or rearrangement of a double bond between C–4 and C–5 and introduction of a double bond between C–1 and C–2 can be carried out without affecting the double bond at C–15.

The process of producing the above described novel compounds comprises, for instance, reacting a compound of the general formula

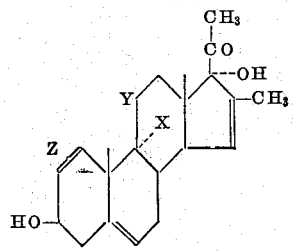

wherein X, Y and Z have the above explained meaning, with iodine in the presence of an inert organic nor-ketonic solvent including a minor proportion of a lower aliphatic alcohol and a compound selected from the group consisting of oxides, salts and hydroxides of the alkali-metals and alkaline earth metals and reacting the resulting 21-iodo-compound with anhydrous potassium acetate so as to obtain the corresponding 21-acetoxy derivative, reacting the latter with chromic acid, and then with potassium hydroxide, so as to obtain the corresponding $\Delta^4$-3-ketone.

This process further comprises the other reactions enumerated hereinbefore, and is correspondingly illustrated, although by way of example only, in the following Reaction Diagram I:

REACTION DIAGRAM I

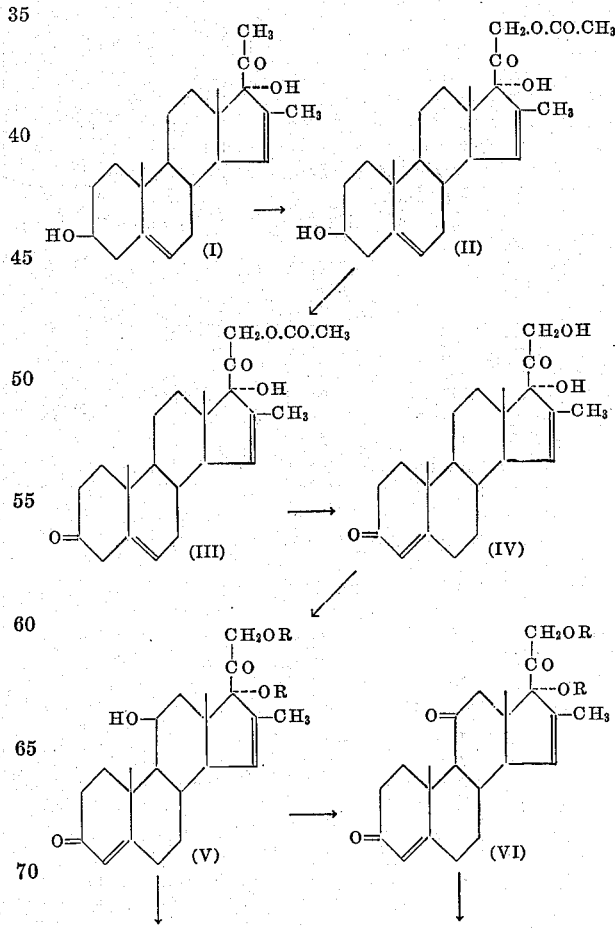

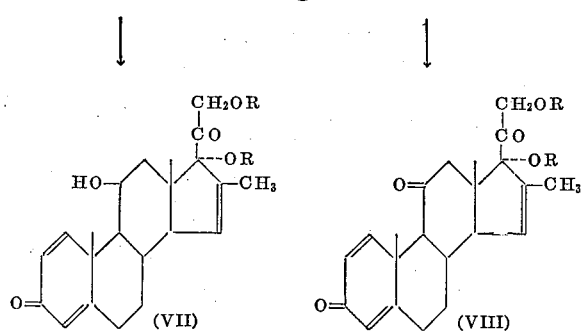

The starting materials utilized in this process of which the compound I in the above Reaction Diagram I, namely 16 - methyl - $\Delta^{5,15}$ - pregnadiene - $3\beta,17\alpha$ - diol - 20 - one, is representative, are produced by a process illustrated in the following reaction equation:

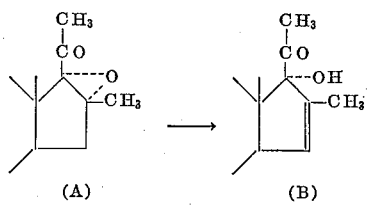

and comprising reacting a $16\beta$-methyl-$16\alpha,17\alpha$-oxido-20-keto-pregnane derivative (A) with a hydrogen halide, preferably aqueous concentrated hydrobromic acid, in an inert organic solvent, preferably acetone at a temperature in the range from $-10°$ C. and lower to room temperature preferably between $0°$ and $+10°$ C.

We assume that during the above described treatment with the hydrogen halide, there is formed an intermediate 16-methyl-16,17-bromohydrin which spontaneously dehydrobrominates to yield the above unsaturated compound (B), i.e., the starting material for the process of the present invention as illustrated in Reaction Diagram I above.

The latter new process comprises, in random sequence, the monoiodination of the starting compound (I), or an analog compound having the same grouping B above, to obtain the corresponding 21-iodo derivative; the latter is acetolyzed to obtain the 21-acetoxy compound (II). The monoiodination and acetolysis were carried out preferably by the method described by Ringold, Stork et al. in Patent 2,874,154.

The hydroxyl group at C–3 was oxidized with chromic acid to the 3-keto group to produce a 16-methyl-21-acetoxy-3-keto derivative such as compound (III); by alkaline treatment, the 21-acetoxy group was hydrolyzed and a double bond present at C–5 was simultaneously rearranged to produce the 16-methyl-15-dehydro-analog of a 21-hydroxy-3-keto-$\Delta^4$-pregnene such as compound (IV); where the $11\beta$-hydroxyl group was not present in the starting compound (I), it was introduced for instance by enzymatic treatment with bovine adrenal glands to obtain compound (V) in which R is preferably hydrogen, which was then esterified to obtain the corresponding 21-esters or 17,21-diesters.

The $11\beta$-hydroxyl group of compound (V) was oxidized to the 11-keto group by reaction with chromic acid in aqueous acetic acid to yield compound (VI); the additional double bond at C–1,2 was introduced into compound V or VI by refluxing with selenium dioxide in mixture with t-butanol and in the presence of catalytic amounts of pyridine to obtain the corresponding $\Delta^{1,4}$-derivative (VII) or (VIII).

Where the starting material (I) was a compound saturated in Ring A, the sequence of the above described reaction steps gave the 5-allo dehydro and the 5-normal dehydro analogs of compounds (V) and (VI); selenium dioxide treatment gave the corresponding 1-dehydro derivatives, when applied to the 5-allo compounds, and the $\Delta^4$-dehydro derivatives when applied to the 5-normal-pregnan compounds.

Under stronger conditions, treatment of either 5-allo or 5-normal pregnanes resulted in simultaneous introduction of two double bonds at C–1,2 and C–4,5.

Saponification by conventional methods yielded the free compounds corresponding to Formulas V, VI, VII and/or VIII.

The corresponding new 16-methyl-$\Delta^{15}$-cortical hormones fluorinated at C–$9\alpha$ were obtained by treatment comprising the acetoxylation of 16-methyl-$9\alpha$-fluoro-$\Delta^{15}$-pregnene-$11\beta,17\alpha$-diol-3,20-dione (IX below) at C–21 via the 21-iodo intermediate, which method has been described above; the resulting 21-acetate of the respective 16-methyl-$9\alpha$ - fluoro - $\Delta^{15}$ - pregnene - $11\beta,17\alpha,21$ - triol - 3,20-dione (X below) was further dehydrogenated, for instance with selenium dioxide, to introduce either one new double bond between C–4 and C–5, or simultaneously two new double bonds at C–4,5 and C–1,2; by hydrolysis of the acetoxy group at C–21 there were obtained the free alcohols and reesterification at C–21 afforded the respective esters; the oxidation of the $11\beta$-hydroxyl group to the keto group (in a 21-ester) produced the corresponding 11-keto compounds. There were thus obtained the 16-methyl-$9\alpha$-fluoro-$\Delta^{15}$-cortical hormones represented by Formula XI and XII below. These reactions are illustrated in the following Reaction Diagram II:

REACTION DIAGRAM II

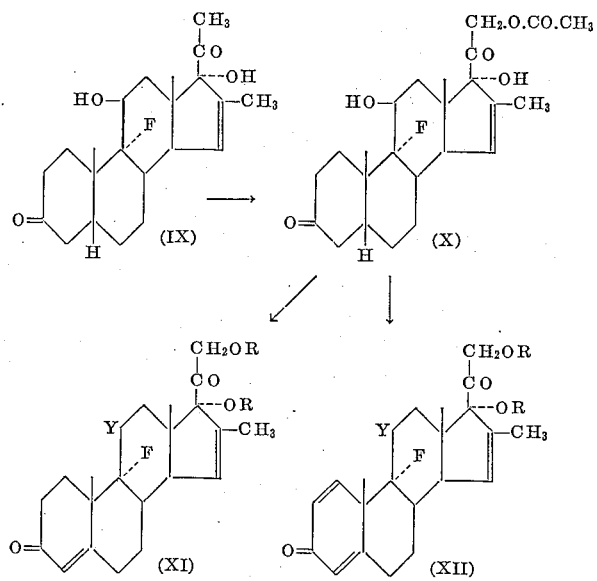

In this reaction diagram R and Y have the meaning explained hereinbefore.

The starting material (IX) for these reactions was prepared by converting the known $\Delta^{16}$-pregnen-$3\alpha$-ol-11,20-dione to its 20-cycloethylene ketal, reducing the 11-keto to the $11\beta$-hydroxy group, hydrolyzing the ketal group, reacting the resulting $\Delta^{16}$-pregnene-$3\alpha,11\beta$-diol-20-one with diazomethane followed by pyrolysis of the resulting pyrazoline, acetylating the 16-methyl-$\Delta^{16}$-pregnene-$3\alpha,11\beta$-diol-20-one thus obtained at C–3, dehydrating the 3-acetate with mesyl chloride in dimethylformamide-pyridine, hydrolyzing the acetoxy group at C–3, and oxidizing the hydrolyzed product to 16-methyl-$\Delta^{9(11),16}$-pregnadiene-3,20-dione. The latter was treated by the method of Fried et al. for introducing a fluorine atom at C–$9\alpha$ as described in J. Am. Chem. Soc. 79, 1130 (1957), to obtain the corresponding 16-methyl-$9\alpha$-fluoro-$\Delta^{16}$-pregnen-$11\beta$-ol-3,20-dione, the C–16,17 double bond of which was then epoxidized with hydrogen peroxide in alkaline conditions, and the resulting $16\alpha,17\alpha$-oxido derivative was reacted with hydrobromic acid in acetone thus affording the corresponding 16-methyl-9α-fluoro-Δ15-pregnene-11β,17α-diol-3,20-dione (IX).

The production of the new compounds according to the invention is further illustrated, by way of example, by the preparation of 16-methyl-15-dehydro-prednisone or its esters from a different starting material by a process illustrated in Reaction Diagram III below:

REACTION DIAGRAM III

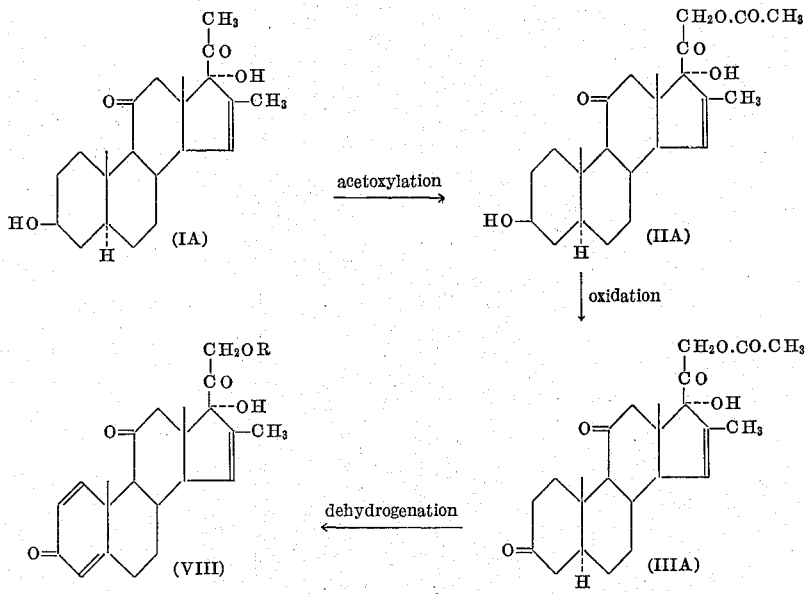

The treatment of the starting material 16-methyl-Δ15-allopregnene-3β,17α-diol-11,20-dione-3-acetate (IA) for obtaining 16-methyl-15-dehydro-prednisone or one of its esters (VIII) is identical with the steps described above in connection with Reaction Diagram I leading from compound (I) via compound (II) to compound (III) therein. Correspondingly, there are obtained in the present process first the 21-acetates of 16-methyl-Δ15-allopregnene-3β,17α-21-triol-11,20-dione (IIA) and then 16-methyl-Δ15-allopregnene-17α,21-diol-3,11,20-trione 21-acetate (IIIA). The latter is then dehydrogenated with selenium dioxide and eventually saponified and reesterified in a conventional manner to obtain compounds (VIII).

Another group of new steroidal Δ15-hormones according to the invention are described by the formula below, in which R, X, Y, and Z have the same meaning as stated hereinbefore:

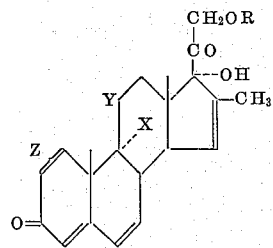

These new Δ4,6,15-trienes and Δ1,4,6,15-tetraenes are also hormones of cortical activity, and are especially anti-androgenic agents.

These new compounds are obtained from the corresponding compounds selected from the first class of new steroidal Δ15-hormones V, VI, VII, VIII, XI and XII, described hereinbefore, by introduction of a further double bond between C-6 and C-7 by dehydrogenation with chloranil.

The invention is further illustrated but not limited by the following examples:

Example 1

To a mixture of 8 g. of 16-methyl-Δ5,15-pregnadiene-3β,17α-diol-20-one, 60 cc. of redistilled tetrahydrofurane and 36 cc. of methanol were added 12 g. of powdered calcium oxide and then 12 g. of iodine, with vigorous stirring and maintaining the temperature around 25° C.; the stirring was continued at 25° C. until the color of iodine disappeared. 1 lt. of methylene chloride was added and the solid was removed by filtration; the filtrate was washed with 10% aqueous sodium thiosulfate solution and water, dried over anhydrous sodium sulfate and evaporated to dryness under reduced pressure and at room temperature. The residue, consisting of the crude 16-methyl-21-iodoΔ5,15-pregnadiene-3β,17α-diol-20-one, was mixed with 1 lt. of dry acetone and 20 g. of anhydrous potassium acetate, refluxed for 18 hours, concentrated to a small volume, diluted with water and the precipitate formed was collected by filtration, washed with water, dried and recrystallized from acetone-hexane, thus yielding the 21-acetate of 16-methyl-Δ5,15-pregnadiene-3β,17α,21-triol-20-one, M.P. 193–195° C., [α]$_D$ —98° (chloroform).

A solution of 5 g. of the above compound in 200 cc. of acetone was cooled to 0° C., flushed with nitrogen and treated with an 8 N solution of chromic acid, under stirring at 0° C. and under an atmosphere of nitrogen, until the color of chromium trioxide persisted in the mixture (the 8 N solution of chromic acid had been prepared by dissolving 26.7 g. of chromium trioxide in 23 cc. of concentrated sulfuric acid and diluting with distilled water to 100 cc.). The mixture was stirred for 5 minutes more at 0° C. under an atmosphere of nitrogen, then diluted with ice water and the precipitate was collected, washed with water, dried and recrystallized from acetone-hexane, to produce the 21-acetate of 16-methyl-Δ5,15-pregnadiene-17α-21-diol-3,20-dione.

A mixture of 4 g. of the above compound and 200 cc. of 1% methanolic potassium hydroxide solution was stirred at 5° C. for 1 hour, acidified with acetic acid, concentrated to a small volume, diluted with water and the precipitate was collected, washed with water, dried and recrystallized from acetone-hexane, thus affording 16-methyl-Δ4,15-pregnadiene-17α,21-diol-3,20-dione, M.P. 212–215° C., λ$_{max}$ 240–242 mμ, log ε 4.18.

There were mixed 425 cc. of a 1.74% aqueous solution of dipotassium hydrogen phosphate (K$_2$HPO$_4$) and 75 cc. of a 1.38% aqueous solution of sodium dihydrogen phosphate (solution "A"). A mixture of 1 lt. of 4.5% aqueous sodium chloride solution, 40 cc. of 5.75% aqueous potassium chloride solution and 10 cc. of 19.1% aqueous magnesium sulfate solution was diluted to 5 lt. to form solution "B." 20.9 g. of fumaric acid and 14.4 g. of sodium hydroxide were dissolved in 1 lt. of water and diluted to 1.2 lt., to obtain solution "C."

There were mixed 475 cc. of solution "A," 4.32 lt. of solution "B" and 1.2 lt. of solution "C."

The fat was removed from the adrenal glands of recently slaughtered bovine and the glands were then ground in a meat grinder until an homogeneous mass was obtained; to 3 kg. of this mass was added 6 lt. of the mixture of solutions "A," "B" and "C," stirring vigorously.

To the above mixture there was then added a solution of 3 g. of 16-methyl-$\Delta^{4,15}$-pregnadiene-17$\alpha$,21-diol-3,20-dione, in 16 cc. of propylene glycol, the mixture was stirred at 28 to 37° C. for 3 hours, and then 40 lt. of acetone was added; the stirring was continued at room temperature for 1 hour further.

The solid was filtered, washed with 2 portions of 10 lt. of acetone, the washings were combined with the filtrate and the solution was concentrated to a volume of approximately 5 lt. under reduced pressure and taking care that the temperature did not rise over 30° C. The aqueous residue was washed with 3 portions of 4 lt. of hexane and the hexane was discarded. The washed aqueous residue was extracted with 2 portions of 3 lt. of methylene chloride and the extract was washed with water, dried over anhydrous sodium sulfate and concentrated to a volume of 300 cc. under reduced pressure and below room temperature. The concentrated solution was transferred to a column charged with a mixture of 90 g. of silica gel and 90 g. of celite, the column was washed with 3 lt. of methylene chloride and 100 cc. of acetone and finally with a mixture of 1600 cc. of methylene chloride and 400 cc. of acetone. The latter washing eluted the 16-methyl-15-dehydro-hydrocortisone, which was purified by recrystallization from acetone-hexane.

A mixture of 2 g. of the above substance, 2 cc. of acetic anhydride and 10 cc. of pyridine was kept overnight at room temperature, then poured into water, heated on the steam bath for half an hour, cooled and the precipitate was collected, washed with water, dried and recrystallized from acetone hexane, thus furnishing the 21-acetate of 16-methyl-15-dehydro-hydrocortisone.

A mixture of 1 g. of the above compound, 50 cc. of t-butanol, 300 mg. of selenium dioxide and a few drops of pyridine was refluxed for 48 hours under an atmosphere of nitrogen, diluted with ethyl acetate and filtered through celite. The solvent was removed by distillation under reduced pressure, the residue was triturated with water and the precipitate was collected, washed with water and purified by chromatography on neutral alumina, to produce the 21-acetate of 16-methyl-15-dihydro-prednisolone. 250 mg. of this substance was hydrolyzed to the free 16-methyl-15-dehydro-prednisolone by the reaction with methanolic potassium hydroxide described above.

A mixture of 500 mg. of the above acetate, 1 g. of chloranil, 12.5 cc. of ethyl acetate and 2.5 cc. of glacial acetic acid was refluxed under an atmosphere of nitrogen for 55 hours. The cooled mixture was washed with 5% aqueous sodium hydroxide solution until the washings were colorless, and then with water to neutral, dried over anhydrous sodium sulfate and the solvent was evaporated under reduced pressure. By chromatography of the residue on neutral alumina, there was obtained the 21-acetate of 16-methyle-6,15-bis-dehydro-prednisolone.

Alternatively, 500 mg. of the 21-acetate of 16-methyl-15-dehydro-prednisolone, 25 cc. of t-butanol and 500 mg. of chloranil were refluxed for 16 hours. The excess of chloranil was then filtered and the solution evaporated under vacuo. The residue was dissolved in 300 cc. of ethyl acetate and the organic solution washed with 10% aqueous sodium hydroxide solution and water, as set forth above, dried over anhydrous sodium sulfate and evaporated to dryness. Crystallization from methylene chloride-methanol, after decolorization with activated charcoal, gave also the 21-acetate of 16-methyl-6,15-bis-dehydro-prednisolone.

The starting material, namely 16-methyl-$\Delta^{5,15}$-pregnadiene-3$\beta$,17$\alpha$-diol-20-one was obtained in the following manner: a solution of 5 g. of 16-methyl-$\Delta^{5,16}$-pregnadien-3$\beta$-ol-20-one acetate described by Wettstein et al. in Helv. Chim. Acta XXVII, 1803 (1944), in 350 cc. of methanol was treated with 20 cc. of a 4 N aqueous solution of sodium hydroxide and immediately afterwards with 20 cc. of 30% hydrogen peroxide, with stirring and maintaining the temperature around 15° C. The mixture was kept overnight in the refrigerator, poured into ice water and the formed precipitate collected thus giving 16$\beta$-methyl-16$\alpha$,17$\alpha$-oxido-$\Delta^5$-pregnen-3$\beta$-ol-20-one.

A stirred solution of 2 g. of this epoxide in 160 cc. of acetone was treated with 8 cc. of an aqueous hydrobromic acid solution of constant boiling point, maintaining the temperature around 5° C. After 15 minutes the reaction mixture was poured into ice water, the precipitate was filtered and recrystallized from acetone hexane, to produce 16-methyl-$\Delta^{5,15}$-pregnadiene-3$\beta$,17$\alpha$-diol-20-one.

*Example 2*

In accordance with the oxidation method described in Example 1, 5 g. of 16-methyl-$\Delta^{5,15}$-pregnadiene-3$\beta$,17$\alpha$-diol-20-one was treated with an 8 N solution of chromic acid in acetone solution, to produce 16-methyl-$\Delta^{5,15}$-pregnadien-17$\alpha$-ol-3,20-dione. The latter compound was dissolved in 50 cc. of glacial acetic acid, 5 cc. of concentrated hydrochloric acid were added and the reaction mixture was allowed to stand at room temperature for 4 hours. It was then poured into ice water, extracted with methylene chloride, the organic extracts were washed with 5% aqueous sodium carbonate solution and water to neutral, dried over anhydrous sodium sulfate and evaporated to dryness under reduced pressure. Chromatography of the residue on neutral alumina gave the pure 16-methyl-$\Delta^{4,15}$-pregnadien-17$\alpha$-ol-3,20-dione.

By treatment of the above compound with calcium oxide and iodine in mixture of tetrahydrofurane-methanol, followed by acetoxylation of the 21-iodo derivative with potassium acetate in acetone solution, in accordance with the method described in Example 1, there was obtained the 21-acetate of 16-methyl-$\Delta^{4,15}$-pregnadiene-17$\alpha$,21-diol-3,20-dione, M.P. 105–110° C., solidifies and remelts at 155–157°, [$\alpha$]$_D$ +43 (chloroform), $\lambda_{max}$ 240 m$\mu$, log $\epsilon$ 4.19.

By following the method of Example 1, the above compound was saponified with 1% methanolic potassium hydroxide, thus affording 16-methyl-$\Delta^{4,15}$-pregnadiene-17$\alpha$, 21-diol-3,20-dione, identical with that obtained in the previous example.

Incubation of the latter compound with adrenal glands, followed by acetylation, as described in Example 1, gave the 21-acetate of 16-methyl-15-dehydro-hydrocortisone.

A stirred solution of 5 g. of the above compound in 150 cc. of acetic acid was treated dropwise with a solution of 1.2 moles of chromium trioxide in 25 cc. of 80% acetic acid, maintaining the temperature at 15–18° C.; the reaction mixture was kept at room temperature for 1 hour more, poured into ice water and the precipitate collected, washed with water to neutral, dried and recrystallized from acetone ether, thus affording the 21-acetate of 16-methyl-15-dehydro-cortisone.

By following the dehydrogenation method of Example 1, the above compound was treated with selenium dioxide in t-butanol, to produce the 21-acetate of 16-methyl- 15-dehydro-prednisone, M.P. 191–193° C., [α]$_D$ +128 (chloroform); λ$_{max}$ 236–238 mμ, log ε 4.18.

Example 3

A solution of 3 g. of 16-methyl-15-dehydro-hydrocortisone, intermediate in the previous examples, in 15 cc. of pyridine, was treated with 5 cc. of propionic anhydride and kept overnight at room temperature; it was then poured into water, heated for half an hour on the steam bath, cooled and the precipitate was collected, washed with water, dried and recrystallized from acetone hexane, thus affording the 21-propionate of 16-methyl-15-dehydro-hydrocortisone.

By an analogous method to that described in the preceding example, there was then oxidized the 11β-hydroxyl group to the keto group and the resulting 21-propionate of 16-methyl-15-dehydro-cortisone was treated with selenium dioxide, in accordance with the method of Example 1 to produce the 21-propionate of 16-methyl-15-dehydro-prednisone, wherein there was then introduced a double bond at C–6,7 by the reaction with chloranil set forth above, thus furnishing the 21-propionate of 16-methyl-6,15-bis-dehydro-prednisone. Hydrolysis of this compound with methanolic potassium hydroxide in accordance with the method described in Example 1, gave the free 16-methyl-6,15-bis-dehydro-prednisone.

Example 4

In accordance with the method described in Example 1, 2 g. of the 21-acetate of 16-methyl-15-dehydro-hydrocortisone, intermediate of the aforesaid example, was refluxed with chloranil in mixture with ethyl acetate and acetic acid; there was thus obtained the 21-acetate of 16-methyl-6,15-bis-dehydro-hydrocortisone. Upon subsequent reaction with selenium dioxide under reflux, by following the procedure described also in Example 1, there was obtained the 21-acetate of 16-methyl-6,15-bis-dehydro-prednisolone, identical with the compound mentioned in such example.

Example 5

A mixture of 10 g. of Δ$^{16}$-pregnen-3α-ol-11,20-dione, described by W. R. Nes et al. in J. Am. Chem. Soc. 73, 4765 (1951), 300 cc. of anhydrous benzene, 120 cc. of ethylene glycol distilled over sodium hydroxide and 1.6 g. of p-toluenesulfonic acid was refluxed for 12 hours with the use of a water separator. Aqueous sodium bicarbonate solution was added to the cooled mixture, the organic layer was separated, washed with water, dried over anhydrous sodium sulfate and the solvent was evaporated. There was thus obtained the 20-cycloethyleneketal of Δ$^{16}$-pregnen-3α-ol-11,20-dione, which was used for the next step without further purification. A small amount was purified by chromatography on neutral alumina.

The above compound was dissolved in 100 cc. of tetrahydrofurane and added to a mixture of 3 g. of lithium aluminum hydride and 200 cc. of anhydrous tetrahydrofurane, little by little, with stirring and cooling. The mixture was refluxed for 4 hours, cooled, treated dropwise with acetone to decompose the excess of hydride, then aqueous saturated sodium sulfate solution was added followed by anhydrous sodium sulfate; the solid was filtered and the solvent was evaporated from the filtrate. There was thus obtained 20-ethylenedioxy-Δ$^{16}$-pregnene-3α,11β-diol in crude form. This compound was dissolved in 200 cc. of acetone, treated with 1 g. of p-toluenesulfonic acid and a few cc. of water and kept overnight at room temperature; it was then concentrated to a small volume under reduced pressure, diluted with water and the precipitate was collected, washed with water, dried and recrystallized from acetone-hexane, thus giving Δ$^{16}$-pregnene-3α,11β-diol-20-one.

2 g. of the above compound were dissolved in 50 cc. of an ether solution of diazomethane prepared from 12.5 g. of nitrosomethylurea and the mixture was kept for 24 hours at room temperature. 1.2 cc. of acetic acid was then added, the solution was evaporated to dryness under reduced pressure in a bath at a temperature below 40° C. and the residue was recrystallized from acetone to produce the pyrazoline, which was then decomposed by the thermal treatment described by Wettstein in Helv. Chim. Acta, XXVII, 1803 (1944), by gradually heating to 180° C. in high vacuum. Recrystallization from acetone of the crude product afforded 16-methyl-Δ$^{16}$-pregnene-3α,11β-diol-20-one.

Treatment of the above compound with an excess of acetic anhydride in pyridine at room temperature, in a conventional manner gave the 3-acetate of 16-methyl-Δ$^{16}$-pregnene-3α,11β-diol-20-one.

10 g. of the above compound were dissolved with slight heating in 125 cc. of dimethylformamide: the mixture was cooled, treated with 4.2 cc. of mesyl chloride and 5 cc. of pyridine and heated at 80° C. for half an hour. Water was added to the cooled mixture, the product was extracted with ethyl acetate, the extract was washed with water, dried over anhydrous sodium sulfate and the solvent was evaporated. Recrystallization of the residue from acetone-hexane yielded the acetate of 16-methyl-Δ$^{9(11),16}$-pregnadien-3α-ol-20-one.

8 g. of the above compound was treated with a solution of 5 g. of potassium hydroxide in a mixture of 100 cc. of acetone and 20 cc. of water, heated on the steam bath for 1 hour, acidified with acetic acid, concentrated to a small volume under reduced pressure, diluted with water and the precipitate was collected, thus giving the free 16-methyl-Δ$^{9(11),16}$-pregnadien-3α-ol-20-one, which was used for the next step without further purification.

The above crude compound was dissolved in 200 cc. of acetic acid and slowly treated under stirring with a solution of 2 g. of chromium trioxide in 40 cc. of 50% acetic acid, taking care that the temperature remained below 15° C. It was then stirred at this temperature for 1 hour more, poured into ice water and the precipitate was collected, washed with water, dried and recrystallized from acetone-hexane, thus affording 16-methyl-Δ$^{9(11),16}$-pregnadiene-3,20-dione.

A mixture of 7.5 g. of the above compound, 75 cc. of pure dioxane and 12 cc. of 0.4 N perchloric acid was treated in the dark at room temperature with 4.2 g. of N-bromoacetamide which was added with stirring and in the course of 1 hour. The stirring was continued for 1 hour further and the solution was then treated with 10% sodium sulfite solution until the starch-potassium iodide indicator paper no longer turned blue; 500 g. of ice and 120 cc. of chloroform were added and the organic layer was separated, successively washed with sodium bicarbonate solution and water, evaporated under reduced pressure in a bath at a temperature below 25° C. and the residue was triturated with a little cold acetone. There was thus obtained 16-methyl-9α-bromo-Δ$^{16}$-pregnen-11β-ol-3,20-dione.

The above crude compound was dissolved in 20 cc. of dioxane and slowly added to a mixture of 3.2 g. of anhydrous potassium acetate and 40 cc. of absolute ethanol which had been heated nearly to boiling. The mixture was refluxed for 45 minutes, cooled and treated with 50 cc. of ice water under continuous stirring. The precipitate was collected, washed with water and dried, thus yielding 16-methyl-9β,11β-oxido-Δ$^{16}$-pregnene-3,20-dione.

The above crude product was dissolved in 150 cc. of methylene chloride, cooled to 0° C. and the solution was treated with a mixture of 12 g. of anhydrous hydrogen fluoride and 20 cc. of tetrahydrofuran previously cooled in a Dry Ice-acetone bath; the hydrogen fluoride solution had been placed in a polyethylene flask fitted with a magnetic stirrer. The addition was effected little by little with stirring, over a period of about 20 minutes; the mixture was then stirred at −10° C. for 6 hours more, neutralized by the cautious addition of 5% aqueous sodium bicarbonate solution; the mixture was transferred to a separatory funnel and the organic layer was washed with water, dried over anhydrous sodium sulfate and concentrated until abundant precipitation. After cooling, the precipitate was collected, redissolved in 40 cc. of hot ethyl acetate, filtered while hot from insoluble material and the filtrate was cooled, thus affording the crystalline 16-methyl-9α-fluoro-Δ$^{16}$-pregnen-11β-ol-3,20-dione.

A solution of 5 g. of the above compound in 65 cc. of chloroform and 155 cc. of methanol was cooled to 0° C. and treated under stirring with 10 cc. of 35% hydrogen peroxide and simultaneously with a solution of 5 g. of sodium hydroxide in 50 cc. of water, dropwise and maintaining the temperature around 0° C. The mixture was then stirred for 1 hour more at 0° C., then at room temperature for 16 hours, poured into ice water, extracted with chloroform and the combined chloroform extracts were washed with water, dried over anhydrous sodium sulfate and the solvent was evaporated. Recrystallization of the residue from acetone-hexane furnished 16-methyl-9α-fluoro-16α,17α-oxido-pregnan-11β-ol-3,20-dione.

20 cc. of constant boiling aqueous hydrobromic acid solution was slowly added to a stirred solution of 5 g. of 16β-methyl-9α-fluoro-16α,17α-oxido-pregnan - 11β - ol - 3, 20-dione in 100 cc. of pure acetone, maintaining the temperature around 10° C.; the mixture was stirred for 1 hour more at 10° C., diluted with ice water and the precipitate was collected, and recrystallized from acetone-hexane. There was thus obtained 16-methyl-9α-fluoro-Δ$^{15}$-pregnene-11β,17α-diol-3,20-dione.

In accordance with the method described in Example 1, the above product was then monoiodinated at C–21 by reaction with iodine and calcium oxide in tetrahydrofurane-methanol, and the resulting 16-methyl-9α-fluoro-21-iodo-Δ$^{15}$-pregnene-11β,17α-diol-3,20-dione was treated with potassium acetate under reflux in mixture with acetone. There was thus produced the 21-acetate of 16-methyl-9α-fluoro-Δ$^{15}$-pregnene-11β,17α,21-triol-3,20-dione.

A mixture of 3 g. of the above compound, 100 cc. of t-butanol, 1 g. of selenium dioxide and a few drops of pyridine was refluxed under an atmosphere of nitrogen for 24 hours, filtered through celite, the filtrate was evaporated to dryness under reduced pressure and the residue was treated in acetone solution with decolorizing charcoal under reflux for 1 hour. The charcoal was removed by filtration, the acetone was evaporated and the residue purified by chromatography on neutral alumina, thus giving the 21-acetate of 16-methyl-9α-fluoro-15-dehydro-hydrocortisone.

Oxidation of 1 g. of the latter compound with chromium trioxide in acetic acid, in accordance with the method described in Example 2, gave the 21-acetate of 16-methyl-9α-fluoro-15-dehydro-cortisone, which was saponified with 1% methanolic potassium hydroxide, by applying the method described in Example 1, thus giving the free 16-methyl-9α-fluoro-15-dehydro-cortisone.

By following the esterification method of Example 3, the above compound was converted into the 21-propionate of 16-methyl-9α-fluoro-15-dehydro-cortisone.

Example 6

5 g. of the 21-acetate of 16-methyl-9α-fluoro-Δ$^{15}$-pregnene-11β,17α,21-triol-3,20-dione, prepared as described in the preceding example, was refluxed with 4 g. of selenium dioxide in mixture was 200 cc. of t-butanol and a few drops of pyridine, for 72 hours; the product was then isolated in accordance with the procedure reported in Example 1. There was thus obtained in only one step the 21-acetate of 16-methyl-9α-fluoro-15-dehydro prednisolone. Further treatment of the above compound with chloranil, in accordance with the method described in Example 1, gave the 21-acetate of 16-methyl-9α-fluoro-6,15-bis-dehydro-prednisolone, which was treated with 1% methanolic potassium hydroxide, by applying the method of Example 1, to produce the free 16-methyl-9α-fluoro-6,15-bis-dehydro-prednisolone.

A solution of 1 g. of the above compound in 5 cc. of pyridine was treated with 3 cc. of cyclopentylpropionic anhydride, and kept overnight at room temperature. It was then poured into water, the formed precipitate was filtered, washed with water, dried and recrystallized from acetone-ether to afford the 21-cyclopentylpropionate of 16-methyl-9α-fluoro-6,15-bis-dehydroprednisolone.

Example 7

In accordance with the method described in Example 1, 2 g. of the 21-propionate of 16-methyl-9α-fluoro-15-dehydro-cortisone, prepared as described in Example 5, was refluxed with chloranil in mixture with ethyl acetate and acetic acid, to produce the 21-propionate of 16-methyl-9α-fluoro-6,15-bis-dehydro-cortisone.

Example 8

In accordance with the proceure described in Example 5, 10 g. of Δ$^{16}$-allopregnen-3β-ol-11,20-dione-acetate, described by Djerassi et al. in J. Am. Chem. Soc. 74, 3634 (1952), were treated with an etheral solution of diazomethane, and the resulting pyrazoline, without further purification, was decomposed by the thermal treatment described by Wettstein et al. in Helv. Chem. Acta XXVII, 1803 (1944), by gradually heating to 140 to 150° C. in high vacuum. Recrystallization of the crude product from acetone-ether gave 16-methyl-Δ$^{16}$-allopregnen-3β-ol-11,20-dione-acetate, M.P. 163–65° C., [α]$_D$ +26 (chloroform), λ$_{max}$ 248–50, 310–14 mµ, log ε 3.98, 2.09, in a 65% yield.

A solution of 5 g. of the above compound in 20 cc. of methylene chloride and 150 cc. of methanol was cooled to 0° C. and treated dropwise under stirring with 10 cc. of 10% aqueous sodium hydroxide solution and simultaneously with 30 cc. of 35% hydrogen peroxide, maintaining the temperature below 5° C. The reaction mixture was stirred for 1 hour further at 0° C. and then allowed to stand at room temperature for 4 days, poured into ice water and extracted with methylene chloride. The combined extracts were washed with water to neutral, dried over anhydrous sodium sulfate and evaporated to dryness. Crystallization from acetone-ether afforded 16β - methyl - 16α,17α - oxido - allopregnan-3β-ol-11,20-dione, M.P. 183–85°, [α]$_D$ +87.3 (chloroform), in 87% yield.

A solution of 5 g. of the preceding epoxide in 100 cc. of acetone was treated with aqueous hydrobromic acid solution, in accordance with the method described in Example 5. There was thus obtained 16-methyl-Δ$^{15}$-allopregnene-3β, 17α-diol-11,20-dione, in 92% yield, M.P. 257–59° C. [α]$_D$ −65 (pyridine).

In accordance with the method described in Example 1, the latter compound was then monoiodinated at C–21 by reaction with iodine and calcium oxide in tetrahydrofurane-methanol and the resulting 21-iodo derivative was treated with potassium acetate in acetone. Chromatography of the crude product gave the 21-acetate of 16-methyl - 15 - dehydro-allopregnene-3β,17α-21-triol-11,20-dione, M.P. 189–91°, [α]$_D$ +13.6 (chloroform).

A solution of 3 g. of the above compound in 60 cc. of acetone was treated with an 8 N solution of chromic acid, following the procedure described in Example 1. There was thus obtained 16-methyl-Δ$^{15}$-allopregnene-17α-21-diol-3,11,20-trione 21-monoacetate.

A stirred mixture of 1 g. of the above compound, 50 cc. of t-amyl alcohol, 300 mg. of selenium dioxide and 0.1 cc. of pyridine was refluxed for 24 hours under an atmosphere of nitrogen; 300 mg. more of selenium dioxide and 0.1 cc. of pyridine were added, and the reaction mixture refluxed for 24 hr. further. It was then cooled, filtered through celite and the filtrate evaporated to dryness under reduced pressure. The residue was triturated with water and the precipitate was collected, washed with water and purified by chromatography on neutral alumina, the fractions eluted with benzene-methylene chloride 1:4 gave the pure 16-methyl-15-dehydro-prednisone acetate, identical with that obtained in Example 2.

Example 9

By a conventional saponification with methanolic potassium hydroxide, 16-methyl-15-dehydro-cortisone 21-acetate, obtained as described in Example 2, is converted to the free 16-methyl-15-dehydro-cortisone.

Example 10

By conventional esterification with acetic anhydride and p-toluenesulfonic acid, 16-methyl-15-dehydro-cortisone is converted to its 17,21-diacetate.

We claim:
1. A compound of the formula

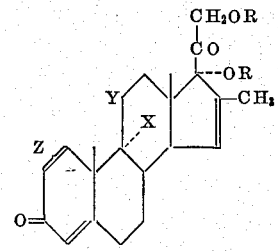

wherein R is selected from the group consisting of hydrogen and the acyl radical of a hydrocarbon carboxylic acid of up to 12 carbon atoms; X is selected from the group consisting of hydrogen and fluorine; Y is selected from the group consisting of

and =O; and Z is the linkage between C-1 and C-2 selected from the group consisting of a single bond and double bond.

2. 16-methyl-15-dehydro-hydrocortisone.
3. 16-methyl-15-dehydro-hydrocortisone 21-acetate.
4. 16-methyl-15-dehydro-hydrocortisone 21-propionate.
5. 16-methyl-15-dehydro-cortisone.
6. 16-methyl-15-dehydro-cortisone 21-acetate.
7. 16-methyl-15-dehydro-cortisone 17,21-diacetate.
8. 16-methyl-15-dehydro-cortisone 21-propionate.
9. 16-methyl-15-dehydro-prednisolone.
10. 16-methyl-15-dehydro-prednisolone 21-acetate.
11. 16-methyl-15-dehydro-prednisone 21-acetate.
12. 16-methyl-15-dehydro-prednisone 21-propionate.
13. 16-methyl-9α-fluoro-15-dehydro-hydrocortisone 21-acetate.
14. 16-methyl-9α-fluoro-15-dehydro-cortisone.
15. 16-methyl-9α-fluoro-15-dehydro-cortisone 21-acetate.
16. 16-methyl-9α-fluoro-15-dehydro-cortisone 21-propionate.
17. 16-methyl-9α-fluoro-15-dehydro-prednisolone 21-acetate.
18. 16-methyl-Δ$^{4,15}$-pregnadiene-17α,21-diol-3,20-dione.
19. 16-methyl-Δ$^{4,15}$-pregnadiene-17α,21-diol-3,20-dione 21-acetate.
20. 16-methyl-Δ$^{15}$-allopregnene-3β,17α,21-triol-11,20-dione.
21. 16-methyl-Δ$^{15}$-allopregnene-17α,21-diol-3,11,20-trione 21-acetate.

22. A compound of the formula

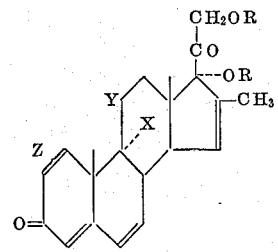

wherein R is selected from the group consisting of hydrogen and the acyl radical of a hydrocarbon carboxylic acid of up to 12 carbon atoms; X is selected from the group consisting of hydrogen and fluorine; Y is selected from the group consisting of

and =O; and Z is the linkage between C-1 and C-2 selected from the group consisting of single bond and double bond.

23. 16-methyl-6,15-bis-dehydro-prednisolone 21-acetate.
24. 16-methyl-6,15-bis-dehydro-prednisone.
25. 16-methyl-6,15-bis-dehydro-prednisone 21-propionate.
26. 16-methyl-9α-fluoro-6,15-bis-dehydrocortisone 21-propionate.
27. 16-methyl-9α-fluoro-6,15-bis-dehydroprednisolone.
28. 16-methyl-9α-fluoro-6,15-bis-dehydro-prednisolone 21-acetate.
29. 16-methyl-9α-fluoro-6,15-bis-dehydro-prednisolone 21-cyclopentyl-propionate.
30. A compound selected from the group consisting of:

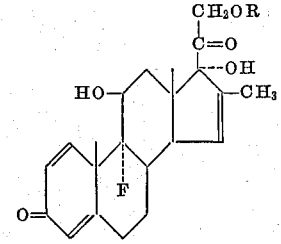

and

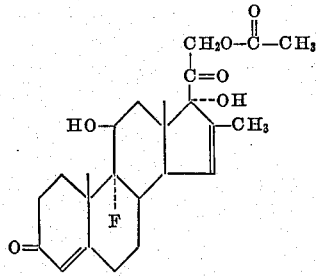

wherein R is selected from the group consisting of hydrogen and the acetyl radical.

No references cited.

LEWIS GOTTS, *Primary Examiner.*

LESLIE H. GASTON, ELBERT L. ROBERTS, M. L. WILLIAMS, *Examiners.*